United States Patent Office 2,710,292
Patented June 7, 1955

2,710,292

PREPARATION OF PLASTIC CONDENSABLE SYNTHETIC RUBBERS AND SUBSEQUENT ELASTO-CONDENSATION THEREOF

Harold P. Brown, Akron, Ohio, assignor to The B. F. Goodrich Company, New York, N. Y., a corporation of New York No Drawing. Application November 1, 1950, Serial No. 193,523

8 Claims. (Cl. 260—83.3)

The present invention relates generally to the preparation of plastic synthetic rubbers which are polymers of an open-chain aliphatic conjugated diene and are further characterized by the ability to undergo useful condensation reactions by reason of the presence in their structure of a controlled amount of free carboxyl (—COOH) groups, and to the subsequent elasticization (or curing) of such plastic synthetic rubbers by a condensation reaction (termed herein "elasto-condensation") involving the free carboxyl groups.

In my copending related application, Serial No. 193,521, filed November 1, 1950, I have disclosed that elastic synthetic rubber condensation products of unusual and highly advantages properties are secured by first preparing a plastic, rubbery polymer containing a controlled amount, from 0.001 to 0.30 chemical equivalents by weight for each 100 parts by weight of rubbery polymer, that is from 0.045 to 13.5% by weight of the rubbery polymer, of combined carboxyl (—COOH) groups, and then condensing the carboxyl-containing, plastic rubbery polymer with a polyvalent metal oxide whereby elasticization of the plastic polymer occurs by reason of a salt-forming condensation-polymerization reaction involving the carboxyl groups of the polymer and the metallic cation of the polyvalent metal oxide, and resulting in a strongly elastic, polymeric metallo-carboxylate. The copending application particularly describes the preparation of the carboxyl-containing plastic rubbery polymer by copolymerization, in aqueous medium under acidic conditions, of a monomeric mixture comprising an open-chain aliphatic conjugated diene and an olefinically-unsaturated carboxylic acid.

This application is directed to another method of producing plastic, carboxyl-containing rubbery diene-type polymers admirably suited to subsequent elasto-condensation reactions. This method involves the reaction with a hydrolyzing agent of a plastic, rubbery interpolymer of an open-chain aliphatic conjugated diene (preferably a butadiene-1,3 hydrocarbon) and an unsaturated copolymerizable material containing a group hydrolyzable to a carboxyl group, such as an unsaturated nitrile (acrylonitrile, for example) ester (an alkyl acrylate or alkacrylate, for example) or amide (acrylamide, for example) thereby to hydrolyze a portion of the hydrolyzable groups and produce a plastic, rubbery polymer containing from 0.001 to 0.30 chemical equivalents by weight of combined carboxyl (—COOH) groups for each 100 parts by weight of polymer. The resulting hydrolyzed or carboxyl-containing polymer is still rubbery and easily worked and, unlike the original polymer, undergoes elasto-condensation reactions with polyvalent metal oxides to produce strongly elastic, polymeric metallo-carboxylates of unusual tensile strength (even in the pure gum or unreinforced condition) and other unusual properties.

By this method it is possible for rubber processors having no polymerization equipment facilities to convert synthetic rubbers some of which are presently commercially available such as copolymers of butadiene-1,3 with acrylonitrile, the copolymers of butadiene-1,3 with methyl methacrylate, and the like to carboxyl-containing rubbery materials capable of undergoing elasto-condensation, and then subsequently to convert the carboxyl-containing rubbers to strongly elastic, polymeric metallo-carboxylates. Another advantage of the method of this invention resides in the fact that a mass of plastic, rubbery polymer may be hydrolyzed on its surface only, so that the surface can partake in elasto-condensation reactions, without necessarily altering the structure of the interior of the mass.

The plastic, rubbery materials utilizable in the hydrolysis step of the method of this application are broadly clasifiable as interpolymers of an open-chain, aliphatic conjugated diene and an olefinically-unsaturated compound copolymerizable therewith containing a group hydrolyzable to a carboxyl (—COOH) group (i. e., a "carboxyl precursor" group). These plastic, rubbery interpolymers are produced by the polymerization of a monomeric mixture of a diene of the above class with one or more comonomers containing a carboxyl precursor grouping, preferably in an aqueous emulsion, under conditions favoring the production of plastic synthetic rubbery materials. The momomeric mixture so polymerized will generally contain a predominant proportion of an open-chain aliphatic conjugated diene including as the butadiene-1,3 hydrocarbons such as butadiene-1,3 itself, 2-methyl butadiene-1,3, 2,3-dimethyl butadiene-1,3, piperylene, 2-neopentyl butadiene-1,3 and other hydrocarbon-substituted homologs of butadiene-1,3, and in addition such substituted open-chain aliphatic conjugated dienes as 2-chloro butadiene-1,3, 2-cyano butadiene-1,3 and others as well as other dienes including the straight-chain pentadienes, the straight- and branch-chain hexadienes and others. The monomeric mixture will also contain a minor proportion of one or more olefinically-unsaturated compounds copolymerizable with the diene and containing a carboxyl-precursor group. Suitable copolymerizable compounds which contain a group hydrolyzable to yield a carboxyl group include monoolefinic esters, nitriles, amides, carboxylic acid chlorides, etc. Preferred monomers are the esters, amides and nitriles of acrylic and substituted acrylic acids, particularly the alpha-alkyl and alpha-halo acrylic acids, including methyl acrylate, ethyl acrylate, butyl acrylate, 2-ethylhexyl acrylate, isooctyl acrylate, 3,5,5-trimethylhexyl acrylate, methyl methacrylate, methyl ethacrylate, butyl methacrylate, butyl ethacrylate, lauryl methacrylate, methyl alpha-chloro acrylate, and other similar esters; acrylonitrile, alpha-chloroacrylonitrile, methacrylonitrile, ethacrylonitrile, and other similar nitriles; acrylamide, N-methyl acrylamide, N-phenyl acrylamide, N,N-dimethyl acrylamide, and other similar amides. Other suitable monomers include maleate and fumarate esters such as dimethyl maleate, diethyl maleate, dimethyl monochloro maleate, diethyl fumarate and others; vinyl esters of carboxylic acids such as vinyl acetate, vinyl chloropropionate, vinyl butyrate, divinyl succinate, divinyl adipate, and others; allyl esters of carboxylic acids such as allyl acetate, allyl propionate, allyl butyrate, and others; unsaturated esters containing cyano groups such as the alpha- and beta-cyano acrylates, alpha-vinyl beta-cyano acetate, alpha-cyano beta-vinyl propionate and others, as well as other polymerizable compounds containing groups hydrolyzable to carboxyl such as methyl beta-acryloxy propionate, acrylyl chloride, allyl chloride, and others. The monomeric mixture should preferably contain from 55 to 95% by weight of the diene and from 5 to 45% by weight of the ester, nitrile, amide or other hydrolyzable monomer.

Hydrolyzable plastic interpolymers also may be produced from multi-component monomeric mixtures containing in addition to the two essential ingredients (i. e. the diene and the monomer containing a carboxyl-precursor group), other monoolefinic materials such as vinylidene chloride, vinylidene chloro-fluoride, styrene, o-chloro styrene, o-methoxy styrene, para-divinyl benzene, vinyl naphthalene, vinyl pyridine, vinyl carbazole, or mixtures of one or more of these and other monoolefinic materials and others. The amount of additional monomers present in the multi-component monomeric mixtures may vary somewhat as long as the butadiene-1,3 hydrocarbon constituent is present in predominant amounts and sufficient of the hydrolyzable ester or nitrile is present to produce, when hydrolyzed, an interpolymer containing the specified amounts of combined carboxyl groups. Generally, however, the multi-component mixtures will contain from 50 to 90% by weight of butadiene-1,3 hydrocarbon, from 5 to 40% of the hydrolyzable ester, amide, nitrile or other hydrolyzable constituent and from 5 to 45% by weight of the additional monoolefinic monomer or mixture of monoolefinic monomers.

The hydrolyzable interpolymers may be prepared in any conventional manner adapted to the production of plastic rubbery materials. It is preferred, however, that the interpolymers be prepared by polymerization in an aqueous medium which may or may not contain an added emulsifier. Polymerization in an aqueous medium containing no added emulsifier results in a polymer dispersion or a flocculent polymer precipitate. Polymerization in an aqueous emulsion in the presence of an added emulsifier results in a stable polymeric dispersion or latex. The latter method is perhaps the most convenient for the purposes of this invention for the polymer latex may be used as such during the hydrolysis reaction. Any emulsifying agent may be utilized in the preparation of the interpolymers including the fatty acid soaps such as potassium oleate, sodium stearate, and others, the rosin and disproportionated rosin acid soaps, the high molal sulphates and sulphonates such as sodium lauryl sulphate, sulphonated petroleum oils, sodium isopropyl naphthalene sulphonate, and others as is well understood by the art. Polymerization catalysts, such as the peroxygen compounds, and polymerization modifiers such as the primary, secondary and tertiary alkyl mercaptans containing from 4 to 16 carbon atoms, as well as other polymerization ingredients, may be utilized in the polymerization, as is well understood in the art of synthetic rubber preparation.

The hydrolysis step may be carried out in various ways differing considerably one from the other but all designed to produce a plastic workable polymer of an open-chain conjugated diene containing a controllable quantity of combined carboxyl (—COOH) groups. Whichever method is utilized, it is to be understood that the various carboxyl-precursor groups vary in their resistance to hydrolysis with the ester groups being the least resistant, the amide groups next, and the nitrile group being the most resistant to hydrolysis and that, therefore, slightly different conditions are required for the hydrolysis of rubbers containing the various groups. In general, the hydrolysis reaction may be carried out at temperatures of 30 to 250° C. The plastic, rubbery interpolymers containing interpolymerized ester groups derived, for example, from ethyl acrylate or methyl methacrylate, are efficiently hydrolyzed at temperatures of 30 to 175° C., more preferably from 40 to 150° C. in as little as from 1 to 10 hours. The interpolymers containing amide groups require temperatures of from 50 to 225° C., more preferably 65 to 200° C. while those containing nitrile groups, which are most resistant to most hydrolyzing agents, require higher temperatures of from 65 to 250° C., more preferably from 75 to 225° C., to be efficiently hydrolyzed in a reaction period of from 1 to 24 hours.

The hydrolysis reaction may be performed in solution in a solvent (or mixture of solvents) for the rubber such as benzene, toluene, acetone, alcohol, methyl ethyl ketone and others or it may be performed by the simple addition of an alkaline hydrolyzing agent to an anionic latex or aqueous dispersion of the rubber, or by the addition of an acidic hydrolyzing agent to a cationic latex or aqueous dispersion of the polymer. Alternatively, the hydrolysis may be performed by masticating the solid rubber and a solid hydrolyzing agent on a rubber mill, or in an internal mixer, at elevated temperatures followed by wash-milling or malaxating in the presence of water or an aqueous acid solution. A still further procedure is to add the hydrolyzing agent to the polymerization mixture during the preparation of the original diene polymer in a manner more fully described below.

The hydrolysis of ester, amide or nitrile rubbers in solution is conveniently carried out by first dissolving the polymer rubber in a suitable solvent to make a dilute solution usually containing from 1 to 25%, preferably from 3 to 15% by weight of rubber. To the dilute rubber solution in an autoclave is added a suitable hydrolyzing agent; the autoclave then is closed and preferably the residual air removed, and the mixture heated for the desired interval of time at temperatures of 30 to 250° C. If an alkaline hydrolyzing agent is utilized the solution is then made acid (to a pH of about 1.0 to 1.5) by addition of suitable amounts of mineral or organic acid. The polymer is then precipitated from solution by addition of about an equal volume of a suitable non-solvent such as an alcohol, hexane and the like and the precipitate freed of solvent by evaporation or drying.

When the hydrolysis reaction is performed on a rubber latex or aqueous dispersion of rubber, the latex is first stabilized by addition of suitable antioxidants or age resistors and also, if needed, by additional amounts of emulsifiers. The latex is then placed in an autoclave, the hydrolyzing agent added, and the vessel and its contents heated to reaction temperature for the desired length of time. The latex usually is stable during such treatment so that coagulation of the latex is necessary. The coagulation is carried out, preferably under acidic conditions, to obtain the solid hydrolyzed polymer rubber. When an alkaline hydrolysis agent is utilized it is to be understood that the latex should be coagulated under acidic conditions and/or the coagulum extracted several times with dilute aqueous acid washes or malaxated in an internal mixture in the presence of water or aqueous acid solutions to produce a solid hydrolyzed polymer containing free carboxyl (—COOH) groups. The resultant solid polymer need only be dried in the conventional manner in order to obtain a plastic, rubbery carboxyl-containing rubber.

The latex hydrolysis reaction procedure is the most practical method for rubber processors having polymerization equipment because it does not require the use and recovery of expensive volatile solvents. However, because the rubber is present in a latex as discrete particles, the hydrolyzable groups in the interior of the particle are attacked by the hydrolysis reagent to a much lesser degree than those at the surface of the particle. For this reason better results are obtained in latex hydrolysis by using lower concentrations of the hydrolysis agent (0.001 to 0.20 chemical equivalents by weight of the hydrolyzing agent per 100 parts of polymer rubber) at higher temperatures of 65 to 250° C. The presence in the latex of a material having a swelling action on the polymer particles, such as residual unreacted monomers, seems to facilitate the hydrolysis reaction and result in higher carboxyl content. For the rubber processors having no polymerization facilities the hydrolysis reaction may also be carried out by masticating the solid ester, amide, or nitrile rubber with a hydrolyzing agent on a rubber mill or in an internal mixer, at temperatures about the same as those used in solution or latex hydrolysis. Again, if alkaline hydrolyzing agents are utilized it is understood that the solid saponified rubber should be malaxated with water or dilute acid in order to produce a plastic, rubbery polymer containing combined free carboxyl (—COOH) groups.

The hydrolysis of the ester, amide, or nitrile groups may also be carried out during polymerization. By this method, which also may be advantageously utilized by rubber processors possessing polymerization facilities, the hydrolyzing agent is incorporated into a suitably stabilized polymerization recipe and the polymerization conducted in any conventional manner at reaction temperatures above 30° C. As in the previously described alternative methods, if alkaline hydrolysis reagents are utilized, the finished latex should be acid coagulated or extracted or malaxated in the presence of water or aqueous acid solutions to generate free carboxyl groups in the polymer.

In any of the described manners of conducting the hydrolysis of ester, amide or nitrile rubbers there may be utilized both alkaline and acidic hydrolyzing agents. Suitable acidic hydrolyzing agents include the strong mineral acids such as hydrochloric acid, sulfuric acid, phosphoric acid and others and in addition certain strong organic acids such as dichloracetic acid and oxalic acid. Illustrative alkaline hydrolysis agents include alkali hydroxides such as sodium, potassium, and ammonium hydroxides; quaternary ammonium bases such as cetyl dimethyl ammonium hydroxide; certain salts of quaternary ammonium bases such as cetyl dimethyl benzyl ammonium bromide and alkyl ($C_{12}$ to $C_{18}$) dimethyl benzyl ammonium chlorides; various primary, secondary, and tertiary amines such as ethylamine, diethylamine, diethylbenzylamine, methyldiethylamine, and strong heterocyclic amines such as piperidine; salts of a strong base and a weak acid such as sodium bicarbonate, sodium carbonate, sodium silicate, sodium meta-silicate, sodium oxalate, sodium lactate and others. The alkaline hydrolyzing agents are much more active than the acidic reagents and are preferred. The strongly alkaline hydrolyzing agents such as the alkaline hydroxides including ammonium hydroxide and the quaternary ammonium bases are particularly preferred for hydrolysis in solution for latex hydrolysis and for hydrolysis during polymerization while the quaternary ammonium salts and the salts of a strong base and a weak acid such as sodium bicarbonate and the like are preferred for hydrolysis by mastication.

The amount of hydrolyzing agent utilized in any of the above-described manners of carrying out the hydrolysis reaction will depend on the hydrolyzing agent itself, on the degree of hydrolysis desired (or rather, on the amount of carboxyl desired in the final polymer) and on the medium in which the hydrolysis is conducted. For example, among the alkaline hydrolyzing agents, sodium hydroxide, potassium hydroxide, ammonium hydroxide, and the quaternary ammonium bases are so strong in their hydrolyzing action that only small amounts need be utilized. The acidic hydrolyzing agents are less active and relatively larger amounts are utilized. In general, at least a chemical equivalent by weight of hydrolyzing agent for every equivalent weight of carboxyl desired in the final product should be utilized. This means that a minimum of 0.001 to 0.300 chemical equivalents by weight per 100 parts by weight of rubber of a hydrolysis reagent should be utilized. In the case of sodium hydroxide, for example, this means the use of 0.04 to 12.0 parts by weight per 100 parts of rubber (P. H. R.). In solution, latex and polymerization hydrolysis where the mobility of the reactants is greatest smaller amounts of hydrolyzing agent are required than in the case of hydrolysis by mastication. Although larger amounts may be utilized, it will generally be found that an amount of hydrolyzing agent from 0.01 to 5.0% by weight based on the polymer is sufficient.

In any event the hydrolysis reaction is preferably conducted in such a manner as to develop in the rubber from 0.001 to 0.30 chemical equivalents by weight of combined (—COOH) per 100 parts by weight of synthetic rubber (hereinafter abbreviated as E. P. H. R.). Synthetic rubbers containing less than 0.001 E. P. H. R. of combined carboxyl are not ordinarily capable of being converted to a sufficiently strong elastic condition by the action of a polyvalent metal oxide and are not preferred. Synthetic rubbers containing in excess of 0.30 E. P. H. R. of combined carboxyl are predominantly resinous in character and are likewise not preferred for the production of elastic, rubbery, polymeric metallo-carboxylates. Plastic synthetic rubbery materials containing from 0.01 to 0.20 E. P. H. R. of combined carboxyl are preferred for the production of elastic compositions having an optimum balance of tensile strength, modulus, elongation and hardness and plastic rubbery materials containing from 0.01 to 0.10 E. P. H. R. of combined carboxyl are preferred for the production of elastic compositions having the best low temperature flexibility.

Conversion of the plastic hydrolyzed solid interpolymers to an essentially elastic condition is brought about by addition of a polyvalent metallic oxide to the hydrolyzed interpolymer, forming an intimate plastic mixture thereof, and heating the resultant plastic mixture until salt formation occurs between the metallic cation of the metallic oxide and the combined carboxyl groups of the interpolymer. The salt formation reaction occurs quite readily, in fact, it occurs to some extent upon longstanding at room temperature. However, heating to moderately elevated temperatures of from 125 to 400° F., more preferably from 150 to 350° F. is usually required to shorten the curing cycle, increase the mobility of the reacting ingredients and insure a sufficient degree of elasto-condensation. The time of heating will vary somewhat, depending on the carboxyl content of the rubber and on the kind and amount of polyvalent metallic oxide employed. Generally, however, a heating or molding cycle of from five to ten minutes to as much as two hours at temperatures of 125 to 400° F. will be found sufficient.

The intermixing of the plastic, rubbery carboxyl-containing rubber with the polyvalent metal oxide is performed in any conventional manner such as by mill-mixing, mixing in a Banbury mixer or other internal mixer, or by mixing an aqueous dispersion of the metal oxide with a latex or artificially-prepared aqueous dispersion of the carboxyl-containing polymer rubber in which case films and shaped articles can be prepared from the resulting mixed dispersion by the coagulant dip or other methods. The mixing of the carboxyl-containing polymer and metal oxide should be performed at moderate working temperatures, that is, below mill roll temperatures of about 275° F. or more preferably below 200° F., in order to avoid "scorching" of the stock. The mastication of the mixture should be continued until the resulting mixture is homogeneous and the metal oxide is well dispersed in the rubber. Softeners, plasticizers, milling aids, age-resistors, carbon black, pigments and fillers, and other substances may be incorporated into the rubber, preferably before addition of the metal oxide. In any case the resulting mixture should be plastic, workable and homogeneous.

The polyvalent metallic oxides utilizable in the elasticization of the carboxyl-containing synthetic rubber include those of zinc (preferred), magnesium, cadmium, calcium, titanium, aluminum, barium, strontium, copper, cobalt, tin, iron, lead and others. Specifically, zinc oxide, calcium oxide, cadmium oxide (CdO), magnesium oxide, dibutyl tin oxide, lead oxide (litharge), barium oxide, cobalt oxide ($CO_2O_3$), tin oxide, and strontium oxide produce superior results and are preferred. In addition, various polyvalent metallic hydroxides (which in reality are hydrated metallic oxides and readily give up water upon being heated or upon reaction with carboxyl groups) such as calcium hydroxide, cadmium hydroxide, zinc hydroxide, barium hydroxide, and others produce satisfactory salt formation or elasto-condensation and may be utilized alone or in admixture with one or more of the above polyvalent metallic oxides.

The amount of polyvalent metallic oxide curing or elasticizing agent required for efficient cure of the hydrolyzed interpolymers will vary depending upon the curing agent itself, upon the carboxyl content of the hydrolyzed interpolymer and upon the compatibility of the oxide with the rubber and on its fineness and state of subdivision. Generally, however, the amount of polyvalent metallic oxide utilized should be sufficient to react with at least one-half of the carboxyl groups present in the polymer. Progressive increases in the amount of metallic oxide, up to a certain point, induce corresponding increases in elastic properties of the cured compositions. A mass action effect is observed when the metallic oxide is utilized in excess of that theoretically required for salt formation. Since excess metallic oxide seems to be a filler only, it is preferred for the realization of maximum strength to utilize amounts of polyvalent metallic oxide chemically equivalent by weight to twice or more the carboxyl content of the rubbery material.

The preparation of representative hydrolyzed interpolymers and their conversion to the elastic condition will be more clearly described in the following specific examples, which are intended merely as illustrations of the nature of my invention and not as limitations on the scope thereof.

*Example 1*

A copolymer of butadiene-1,3 and ethyl acrylate is prepared by the polymerization of a reaction mixture having the following composition:

| Material: | Parts by weight |
| --- | --- |
| Butadiene-1,3 | 90 |
| Ethylacrylate | 10 |
| S. F. flakes | 5 |
| Potassium persulphate | 0.3 |
| Tertiary dodecyl mercaptan | 0.1 |
| Daxad 11P [1] | 1.0 |
| Water | 200.0 |

[1] Polymerized sodium salts of alkyl naphthalene sulfonic acids.

In the production of this copolymer, the water, emulsifier, catalyst and modifier are first added to the reaction vessel. The reaction vessel is then evacuated and the vacuum broken by the addition of the butadiene and a small portion of the ethyl acrylate (about 10%). The reaction mixture is warmed to 50° C. with agitation. When the reaction is commenced, introduction of ethyl acrylate is started and it is added at a uniform rate over the reaction cycle until ten parts have been added. The resultant latex is short-stopped and stabilized by the addition of 0.1% by weight of hydroquinone and 1.5% by weight of phenyl beta-naphthylamine based on the latex polymer solids. The latex is then stripped of a small proportion of unpolymerized volatile monomeric materials by distillation under vacuum.

A quantity of the finished copolymer latex is first warmed to 40 to 50° C. and 2 N sodium hydroxide solution added slowly while stirring until a total of 0.44 mole per 100 grams of polymer are added. The reaction vessel is then closed and heated to a temperature of 110° C. for six hours. The strongly alkaline latex at 45 to 55° C. is then slowly acidified with 3.7% hydrochloric acid to a pH between 1.0 and 1.5. After acidulation it is found that the latex has coagulated. The resultant coagulum is then twice heated to 60 to 70° C. in several volumes of acidulated water (pH 1.0 to 1.5) and then warmed to 50 to 60° C. with two or more changes of fresh water until only traces of chloride can be detected in the final wash water. The coagulum is then dried in a circulating air oven at 60° C.

The carboxyl content of the hydrolyzed copolymer is determined by dissolving one gram of the copolymer in 100 millimeters of a solvent (chlorobenzene-ethanol 95:5) and titrating a 10 mm. sample of the clear solution with stanardized alcoholic potassium hydroxide using phenolphthalein as an indicator. The copolymer is found to contain 0.11 E. P. H. R. of carboxyl.

To the hydrolyzed copolymer, there are added on a rubber mill eight P. H. R of zinc oxide and milling is continued until a plastic, homogeneous mixture is obtained. The plastic mixture is press-molded for 40 minutes at 300° F. and a clear and elastic composition having a pure gum tensile strength of over 1,000 lbs./sq. in., and an elongation of 675% is obtained.

*Example 2*

A copolymer latex is prepared by the method of Example 1 from a monomeric mixture comprising 90 parts by weight of butadiene-1,3 and 10 parts by weight of methyl methacrylate.

The finished latex, after being stripped of residual unreacted monomers, is warmed to 50° C. and 2 N sodium hydroxide solution added thereto until a total of 0.51 mole per 100 grams of polymer has been added. The highly alkaline latex is then heated in a closed vessel for six hours at 170 to 175° C. and then cooled to 55° C. The latex is then acidified with 3.7% HCl to a pH of 1.0 to 1.5. At the latter point the latex is coagulated. The coagulum is heated first with several washes at 60° C. with acidified water and then with several clear water washes until acid free. The coagulum is dried at 60° C.

The hydrolyzed interpolymer is found to contain 0.05 E. P. H. R. of carboxyl. Upon being admixed with 8 P. H. R. of zinc oxide and heated for 60 minutes at 326° F. a strong elastic composition is obtained having a tensile strength of 3660 lbs./sq. in., a modulus at 300% elongation of 2060 lbs./sq. in., and an ultimate elongation of 410%. When, however, another portion of the butadiene methyl methacrylate latex without being stripped of residual unreacted monomers, is similarly treated with only 0.39 mole of NaOH per 100 grams of polymer, a hydrolyzed polymer is obtained containing 0.14 E. P. H. R. of (—COOH). When mixed with 8 P. H. R. of zinc oxide and heated for 60 minutes at 270° F., an elastic composition is obtained having a tensile strength of 4210 lbs./sq. in., a modulus of 910 lbs./sq. in., and an elongation of 550%. It is evident that the presence of unreacted monomers facilitates the hydrolysis reaction.

*Example 3*

A copolymer latex is prepared by the method of Example 1 from a monomeric mixture consisting of 85% by weight of butadiene-1,3 and 15% of methyl methacrylate. The polymerization reaction is terminated at 85% conversion so as to obtain a polymer latex containing small amounts of unreacted methyl methacrylate. The latex is short-stopped with 0.1% by weight of hydroquinone, and stabilized with 1.5% by weight of phenyl beta-naphthylamine. One portion of the finished latex is stripped of its unreacted monomeric materials. Both portions are treated identically with 2 N sodium hydroxide as in Example 2. The hydrolyzed copolymer obtained from the stripped latex contains 0.04 E. P. H. R. of carboxyl and the hydrolyzed interpolymer derived from the latex containing unreacted methyl methacrylate is found to contain 0.12 E. P. H. R. of carboxyl. When each portion of the hydrolyzed interpolymer is admixed with 8 P. H. R. of zinc oxide and heated for 80 minutes at 300° F., the sample containing 0.12 E. P. H. R. of carboxyl was found to have a tensile strength of 2,000 lbs./sq. in., almost double that obtained from the sample containing 0.04 E. P. H. R. of carboxyl. It is believed that the unreacted monomeric material swelled the latex particles making them more readily subject to attack by the hydrolyzing agent.

Example 4

A copolymer is prepared in a reaction medium similar to that of Example 1, utilizing a monomeric mixture consisting of 90 parts by weight of butadiene-1,3 and 10 parts by weight of acrylonitrile. The unstripped latex is treated with 0.2 mole per 100 grams of polymer of sodium hydroxide (0.2 N) and agitated at a temperature of 200° F. for six hours. The resultant hydrolyzed copolymer is found to contain 0.08 E. P. H. R. of carboxyl. Upon addition of 8 P. H. R. of zinc oxide and being heated for 60 minutes at 270° F. a strong elastic composition is obtained.

Example 5

A copolymer is prepared in a reaction medium similar to that of Example 1, utilizing a monomeric mixture consisting of 83% by weight of butadiene-1,3 and 17% by weight of methacrylamide. The unstripped latex is mixed with 0.2 mole of sodium hydroxide per 100 parts of polymer and agitated at a temperature of 200° F. for 4 hours. The latex is made acid (pH 1.0 to 1.5) with HCl and the resulting coagulum washed 3 times with 3% HCl solution and then with clear water until it was free of chloride ion. The resultant hydrolyzed copolymer is found to contain 0.08 E. P. H. R. of carboxyl. Upon addition of 8 P. H. R. of zinc oxide and being heated for 60 minutes at 290° F. a strong, elastic polymeric metallo-carboxylate is obtained.

Example 6

A plastic copolymer made by polymerization in aqueous emulsion from a monomeric mixture consisting of 85% by weight of butadiene-1,3 and 15% methyl methacrylate is dissolved in benzene to make a 5% solution. To the resulting solution 0.15 chemical equivalents by weight of potassium hydroxide per 100 parts of polymer are added, the reaction vessel closed, and its contents agitated for 5 hours at 50° C. The solution is then made acid to a pH of about 1.5 by addition of HCl. The polymer is precipitated by addition of an equal volume of non-solvent for the polymer and the precipitate freed of solvent by drying. The resultant platsic rubbery material is found to contain 0.11 E. P. H. R. of (—COOH). When carboxyl-containing rubber material is admixed with 8 P. H. R. of zinc oxide and heated for 40 minutes at 300° F., an elastic polymeric metallo-carboxylate is obtained having a tensile strength in excess of 3,000 lbs./sq. in.

Example 7

Substitution in the previous examples for the zinc oxide of respectively, 8 P. H. R. of calcium hydroxide, 12 P. H. R. of cadmium oxide, 14 P. H. R. of cadmium hydroxide, 5 P. H. R. of magnesium oxide, 11 P. H. R. of magnesium hydroxide, 20 P. H. R. of dibutyl tin oxide, 22 P. H. R. of lead oxide, 15 P. H. R. of barium oxide, 22 P. H. R. of barium hydroxide and equivalent amounts of other polyvalent metallic oxides produces similarly strong elastic compositions.

While the invention has been described in considerable detail with respect to the manner of treatment of various polymeric materials, it is to be understood that the invention is not limited solely thereto, and that various equivalent polymeric materials and other equivalent methods of treating them, which will be obvious to those skilled in the art, are within the spirit and scope of the invention as defined by the appended claims.

I claim:

1. The method which comprises preparing a mixture of (1) a carboxyl-containing diene polymer prepared by reacting a plastic interpolymer obtained by the polymerization of a monomeric mixture comprising an open-chain aliphatic conjugated diene and an olefinically-unsaturated copolymerizable material containing a group hydrolyzable to a carboxyl group with a hydrolyzing agent at 30 to 250° C. to generate in said plastic interpolymer from 0.001 to 0.30 chemical equivalents by weight of combined —COOH groups per 100 parts by weight of interpolymer, and (2) an amount of a polyvalent metal oxide at least equivalent chemically to one-half of said combined —COOH and heating the resulting plastic composition at a temperature of from 125 to 400° F. until the plastic composition has been converted to an essentially elastic polymeric metallocarboxylate by salt-formation occurring between the metallic cation of said polyvalent metal oxide and the combined —COOH groups of said hydrolyzed interpolymer.

2. The method which comprises preparing a mixture of (1) a carboxyl-containing diene polymer prepared by adding an aqueous alkali hydroxide solution to an aqueous dispersion of a plastic interpolymer obtained from the polymerization in aqueous emulsion of a monomeric mixture comprising a major proportion of butadiene-1,3 and a minor proportion of a polymerizable compound selected from the class consisting of the esters, amides and nitriles of acrylic and substituted acrylic acids, heating the resulting mixture at 30 to 250° C. and then adding a strong acid to coagulate said dispersion and generate in said plastic interpolymer from 0.001 to 0.30 chemical equivalents by weight of combined —COOH groups per 100 parts by weight of interpolymer, and (2) an amount of a polyvalent metal oxide at least equivalent chemically to one-half said combined —COOH and heating the resulting plastic composition at a temperature of from 125 to 400° F. until the plastic composition has been converted to an essentially elastic polymeric metallo-carboxylate.

3. The method which comprises preparing a mixture of (1) a carboxyl-containing diene polymer prepared by adding an aqueous alkali hydroxide solution to an aqueous polymeric dispersion obtained from the polymerization in aqueous emulsion of a monomeric mixture comprising from 55 to 95% by weight of butadiene-1,3 and from 5 to 45% by weight of methyl methacrylate, heating the resulting mixture at a temperature of 65 to 250° C. and then adding a strong mineral acid so as to coagulate said dispersion and generate in the polymer of said dispersion from 0.01 to 0.20 chemical equivalents by weight of combined —COOH groups per 100 parts by weight of polymer, and (2) an amount of a polyvalent metal oxide at least equivalent chemically to said combined —COOH, and heating the resulting plastic composition at a temperature of from 125 to 400° F. until the plastic composition has been converted to an essentially elastic polymeric metallo-carboxylate.

4. The method which comprises preparing a mixture of (1) a carboxyl-containing diene polymer prepared by first treating an aqueous dispersion of a plastic copolymer obtained from the polymerization in aqueous emulsion of a monomeric mixture consisting of a major proportion of butadiene-1,3 and a minor proportion of acrylonitrile with an alkali metal hydroxide at a temperature of from 65 to 250° C. and then with a strong inorganic acid so as to obtain a plastic rubbery material containing from 0.01 to 0.20 chemical equivalents by weight of combined —COOH per 100 parts by weight of copolymer, and (2) an amount of a polyvalent metal oxide at least equivalent chemically to said combined —COOH and heating the resulting plastic composition at a temperature of from 125 to 400° F. until the plastic composition has been converted to an essentially elastic polymeric metallo-carboxylate.

5. The method which comprises preparing a mixture of (1) a carboxyl-containing diene polymer prepared by first dissolving in a solvent therefor a plastic copolymer obtained from the polymerization in aqueous emulsion of a monomeric mixture consisting of from 55 to 95% by weight of butadiene-1,3 and from 5 to 45% by weight of methyl methacrylate, adding a hydrolyzing agent to the resulting solution, heating said polymer solution at a temperature of from 30 to 250° C., recovering the solid polymer from the solution in a condition so as to contain from 0.01 to 0.20 chemical equivalents by weight of combined —COOH per 100 parts by weight of copolymer, and (2) an amount of a polyvalent metal oxide at least equivalent chemically to said combined —COOH to form a homogeneous plastic composition, and heating the resulting plastic composition at a temperature of from 125 to 400° F. until the plastic composition has been converted to an essentially elastic polymeric metallocarboxylate.

6. The method of claim 2 in which the polyvalent metal oxide is zinc oxide.

7. The method of claim 3 in which the polyvalent metal oxide is zinc oxide.

8. The method of claim 4 in which the polyvalent metal oxide is zinc oxide.

References Cited in the file of this patent

UNITED STATES PATENTS

| | | |
|---|---|---|
| 2,217,632 | Wolfe | Oct. 8, 1940 |
| 2,395,506 | Sauser | Feb. 26, 1946 |
| 2,416,060 | McAlevy et al. | Feb. 18, 1947 |
| 2,619,477 | Banes et al. | Nov. 25, 1952 |

FOREIGN PATENTS

| | | |
|---|---|---|
| 602,843 | Great Britain | June 3, 1948 |